Feb. 28, 1967 W. J. JENKINS 3,306,121
FAN BELT ADJUSTER
Filed Oct. 20, 1964

Inventor
William Joseph Jenkins
by Michael J. Striker

United States Patent Office 3,306,121
Patented Feb. 28, 1967

3,306,121
FAN BELT ADJUSTER
William Joseph Jenkins, 962 Pacific Highway, Roseville,
New South Wales, Australia
Filed Oct. 20, 1964, Ser. No. 405,047
4 Claims. (Cl. 74—242.15)

The present invention relates to fan belt mountings such as are used in the engines of motor vehicles.

It is usual in such engines to drive the water pump, cooling fan and the electrical generator by means of a single V-belt from the crankshaft. In order to function satisfactorily, it is necessary that the tension in the belt be correctly adjusted and this is normally done by mounting the generator so that it is pivotable about an axis parallel to the axis of the generator pulley thus providing a means by which the distance of the generator pulley from the water pump and cooling fan pulley may be adjusted, means being provided for clamping the generator in any desired position. With this arrangement, there is always the danger that the generator may be pulled out too hard, thus setting up too great a tension in the fan belt which may lead to the early failure of the fan belt; or alternatively, insufficient tension may be applied to the fan belt which can result in ineffective driving of the generator and thus improper charging of the battery.

The object of the present invention is to provide a means which will ensure that the fan belt is at all times maintained at the proper tension by the provision of a spring loaded tensioning device.

The invention consists in a fan belt mounting for the engine of a motor vehicle wherein the cooling fan and the electrical generator are driven from the crankshaft by a V fan belt passing over pulleys and wherein the generator is pivotable about an axis parallel to the axis of the generator pulley to enable the distance between the generator pulley and the cooling fan pulley to be adjusted, the mounting including spring means acting on the generator to maintain the tension in the fan belt substantially constant and means whereby the force exerted by said spring means may be adjusted.

Figure 1:
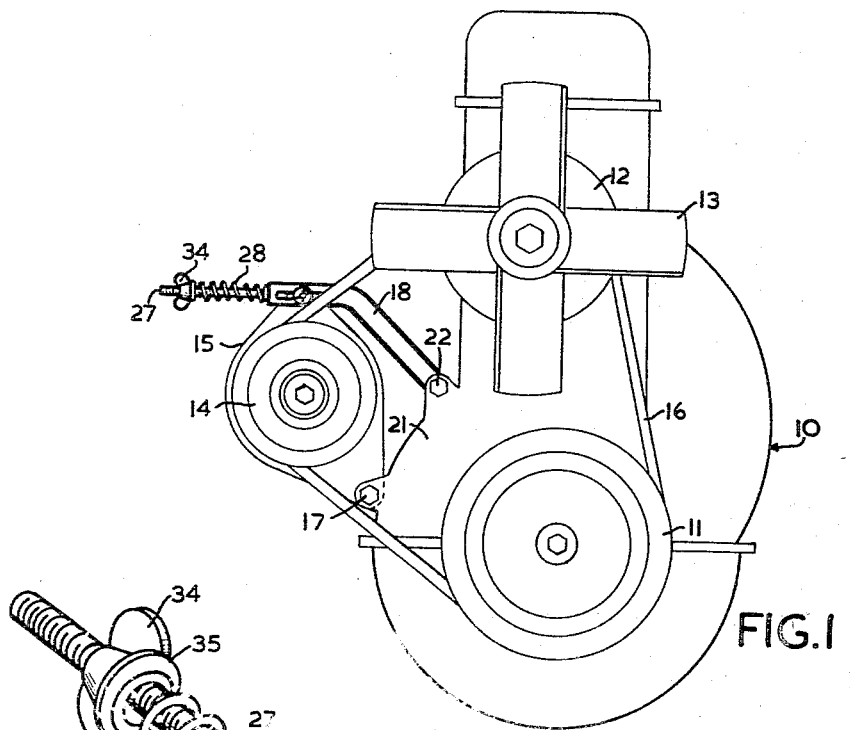
Figure 2:
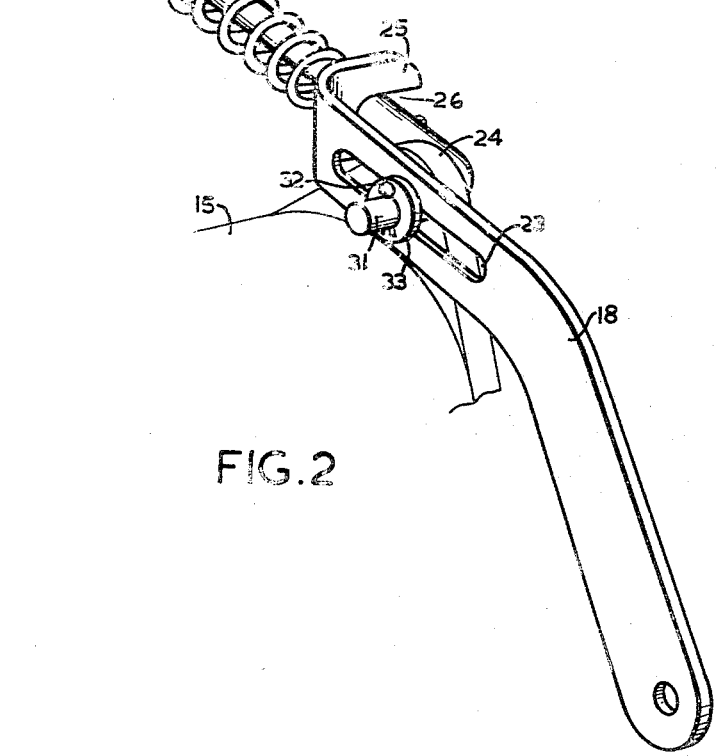

In order that the invention may be better understood and put into practice a preferred embodiment thereof is hereinafter described by way of example with reference to the accompanying drawings in which:

FIG. 1 is an end view of the engine of a motor vehicle incorporating an embodiment of the invention and FIG. 2 is a perspective view, to an enlarged scale, of the fan belt tensioning means.

The embodiment of the invention to be described is in principle suitable for many popular makes of car, such as Ford or Holden, but it will be readily appreciated that the invention is applicable to almost any type of vehicle engine having a fan belt, the tension of which is adjustable in the manner described above.

In FIG. 1 an engine 10 is shown having a crankshaft pulley 11, a pulley 12 driving both the fan 13 and the water pump (not shown), and a pulley 14 driving the generator 15, a V fan belt 16 running in the pulleys.

The generator 15 may be pivoted about an axis passing through the bolt 17 so that it may be moved towards or away from the pulley 12. A cranked bracket 18 is pivotably attached to the crankcase 21 by a bolt 22 and extends upwardly and outwardly from it towards the generator 15. The bracket 18 has formed in it a slot 23 which coincides with a hole formed in a lug 24 of the generator casing. The end 25 of the bracket 18 is bent over at right angles and has formed in it an open slot 26. A rod 27 having a threaded portion at one end and being bent at right angles at the other, serves to connect the lug 24 of the generator 15 to the arm 18 and to support a coil spring 28.

The end 31 of the rod 27 passes through the hole in the lug 24 and the slot 23 and is maintained in position by the split pin 32 and washer 33. The main portion of the rod 27 passes through the slot 26 and is surrounded by the spring 28 which acts between the end 25 of the bracket 18 and a butterfly nut 34 and washer 35.

It will be readily seen that the arrangement is such that as the butterfly nut is screwed onto the rod 27 the spring 28 is compressed and a force is applied to the generator 15 acting to tension the fan belt 16 which force may be readily adjusted by means of the butterfly nut 34. The spring 28 acts to maintain a steady tension on the belt 16.

The arrangement described above is given by way of example only, as constituting one form of the invention, but it will be readily appreciated by those skilled in the art that a variety of other constructions may be provided within the scope of the invention in which means are provided to maintain the fan belt under substantially constant tension by the provision of a spring.

What I claim is:

1. A belt tensioning device for a belt passing over a sheave mounted on a first support and over a pulley mounted on a second support turnable about a pivot axis parallel to the axes of said sheave and pulley, comprising, in combination, an elongated bracket; means for securing said bracket at one end to such first support; first abutment means at the other end of said bracket; a rod-shaped adjusting member secured at one end both to the turnable second support at a point spaced from the pivot axis thereof and also to said elongated bracket so as to be movable in longitudinal direction of the latter; adjustable second abutment means mounted at the other end of said rod-shaped adjusting member adjustable in longitudinal direction thereof; and compression-spring means mounted on said rod-shaped adjusting member surrounding the same and abutting with one end against said first abutment means on said elongated bracket and with the other end against the second abutment means on said rod-shaped adjusting member so as to permanently tend to move said rod-shaped adjusting member together with the second support in a direction away from said one end of said elongated bracket.

2. A device as defined in claim 1, wherein said first abutment means comprises a portion of said bracket extending at a right angle to the remainder of the same and provided with an opening through which said rod-shaped adjusting member extends so as to be guided thereby.

3. A device as defined in claim 2, wherein said bracket is formed adjacent said portion thereof with a slot extending in longitudinal direction of the bracket, and wherein said rod-shaped adjusting member comprises an end portion extending at an angle to the remainder thereof and projecting through said slot to be guided therein for longitudinal movement relative to said bracket, said end portion being secured to the second support.

4. A device as defined in claim 2, wherein said bracket is turnable about a pivot axis parallel to the first-mentioned axes.

(References on following page)

References Cited by the Examiner

UNITED STATES PATENTS

| | | | |
|---|---|---|---|
| 768,392 | 8/1904 | Moskowitz | 74—242.13 X |
| 1,441,321 | 1/1923 | Wyatt et al. | 74—242.15 |
| 1,835,617 | 12/1931 | Stewart | 74—242.11 X |
| 1,868,533 | 7/1932 | Johnson | 74—242.13 X |
| 2,392,573 | 1/1946 | Brock et al. | 74—242.8 X |
| 2,806,382 | 9/1957 | Gehrke | 74—242.11 |

DAVID J. WILLIAMOWSKY, *Primary Examiner.*

J. A. WONG, *Assistant Examiner.*